United States Patent Office

3,708,468
Patented Jan. 2, 1973

3,708,468
DISPERSE PHENYL-AZO-PHENYL DYES
Rasso Hahn, Basel, and Curt Mueller, Binningen, Switzerland, assignors to Sandoz Ltd., Basel, Switzerland
No Drawing. Filed Apr. 14, 1969, Ser. No. 816,011
Int. Cl. C07c *107/06;* C09b *29/08*
U.S. Cl. 260—207                                        6 Claims

ABSTRACT OF THE DISCLOSURE 2-halogeno-4-nitro-2'-acylamino - 4' - (dialkyl)-amino-1,1'-azobenzene dyes are suitable for dyeing fibres consisting of hydrophobic organic substances of high molecular weight and materials made of these fibres. Resulting dyeings are of red shade, have good fastness properties, good wool reserve and dischargeability and stability to action of soil release finishes and permanent press finishing processes.

---

This invention relates to dyes of the 2-halogeno-4-nitro-2'-acylamino-4'-(dialkyl)-amino - 1,1' - azobenzene series which are highly suitable for dyeing fibres consisting of hydrophobic organic substances of high molecular weight and to materials made of these fibres. The new dyes are of the formula

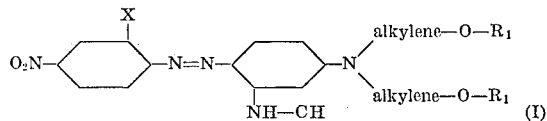

where X stands for a chlorine or bromine atom, $R_1$ for a benzylcarbonyl or phenoxyacetyl group, which may bear non-water-solubilizing substituents. The term "non-water-solubilizing substituents" refers to all the substituents commonly present in dyes with the exception of carboxylic acid and sulphonic acid groups.

In the preferred dyes the phenyl radicals of the substituent $R_1$ are unsubstituted or substituted by halogen atoms, in particular fluorine, chlorine or bromine atoms, alkyl, alkoxy or nitro groups.

All the alkyl, alkoxy and alkylene radicals in the new dyes contain preferably 1, 2, 3 or 4 carbon atoms.

The dyes are produced either by diazotization of an amine of the formula

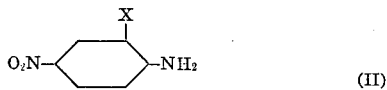

and the coupling of the resulting diazonium compound with a compound of the formula

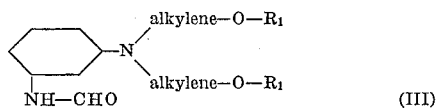

or by acylation of 1 mole of an azo compound of the formula

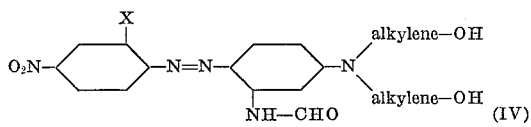

with 2 moles of an acid of the formula

or preferably of suitable functional derivatives thereof, e.g. the anhydride or halides, in particular the chloride.

The coupling reaction generally takes place in acid medium with cooling; the medium may be buffered if necessary, sodium acetate being a particularly suitable buffering agent.

The reaction of azo compounds of Formula IV with acids of Formula V or their derivatives can be effected in an inert organic solvent, e.g. dioxane, nitrobenzene, xylene, toluene or a chlorobenzene, or in an excess of the compound (V), which then serves simultaneously as solvent, at temperatures ranging from about 10° to 40° C. It can be of advantage to react in the presence of an acid binding agent, e.g. magnesium oxide, an alkali carbonate or bicarbonate.

The dyes of Formula I can be worked up into dye preparations by known methods, e.g. by grinding in the presence of dispersing agents and/or fillers, with subsequent vacuum or injection drying. After the addition of a suitable volume of water the dye preparations can be applied to the fibre by exhaustion dyeing, pad dyeing or printing processes at a long or short liquor to goods ratio.

From aqueous dispersion the dyes build up excellently on textile fibres consisting of synthetic and semi-synthetic high molecular organic substances of hydrophobic character. They are highly suitable for dyeing and printing textiles of polyester, cellulose diacetate, cellulose triacetate and polyamide fibres.

The known dyeing and printing methods are employed for their application, e.g. that described in French Pat. 1,445,371.

The dyeings obtained are of red shade and have very good all-round fastness, with particularly good fastness to light, washing, perspiration, rubbing, alkali, gas fumes, ozone and sea water. They are stable to heat treatments, including thermofixation and pleating, at temperatures up to 180° C. without sublimation, and show similarly good reduction stability. The wool reserve and the dischargeability are good. The dyes are stable to the action of soil release finishes and the pre-cure and post-cure permanent press finishing processes.

In the following examples the parts and percentages are by weight and the temperatures in degrees centigrade.

EXAMPLE 1

In the presence of hydrochloric acid 17.2 parts of 1-amino-2-chloro-4-nitrobenzene are diazotized with 7 parts of sodium nitrite in the normal manner. After the addition of 3 parts of urea the diazonium salt solution is filtered. Coupling is effected at 0–5° by adding to the filtered solution of the diazonium salt a solution of 49 parts of 1-N,N-di-(β-phenoxyacetoxyethyl) - amino-3-formylaminobenzene in 50 parts of glacial acetic acid. The red dye thus formed is filtered off, washed with water until free of acid and dried.

EXAMPLE 2

17.2 parts of 1-amino-2-chloro-4-nitrobenzene are diazotized with 7 parts of sodium nitrite by the normal method in the presence of hydrochloric acid. Subsequently 3 parts of urea are added and the diazonium salt solution is filtered. Coupling is effected at 0–5° by adding to the filtered solution of the diazonium salt a solution of 22.4 parts of 1-N,N-di-(β-hydroxyacetyl)-amino - 3 - formylaminobenzene in 50 parts of glacial acetic acid. The product settles out and is filtered off, washed with water until free of acid, dried and dissolved in dioxan. This solution is mixed with 31 parts of phenylacetic acid chloride in the presence of magnesium oxide at room temperature and with stirring. After about 2 hours the red dye formed is filtered off, washed and dried.

The following table gives details of further red dyes of Formula I which can be produced in accordance with the procedures of Examples 1 or 2.

TABLE

| Example No. | Alkylene-O-R₁ | X |
|---|---|---|
| 3 | −CH₂CH₂−O−CO−CH₂O−⟨C₆H₄⟩(C₂H₅) | Cl |
| 4 | −CH₂CH₂−O−CO−CH₂−⟨C₆H₄⟩(Br) | Cl |
| 5 | −CH₂CH₂−O−CO−CH₂−⟨C₆H₄⟩−OC₃H₇ | Cl |
| 6 | −CH₂CH₂−O−CO−CH₂−⟨C₆H₄⟩(Cl) | Br |
| 7 | −CH₂CH₂−O−CO−CH₂−⟨C₆H₄⟩−NO₂ | Br |
| 8 | −CH₂CH₂−O−CO−CH₂−O−⟨C₆H₄⟩(CH₃) | Br |
| 9 | −CH₂CH₂−O−CO−CH₂−⟨C₆H₄⟩(OCH₃) | Cl |
| 10 | −CH₂−CH(CH₃)−O−CO−CH₂−O−⟨C₆H₄⟩−F | Cl |
| 11 | −CH₂CH₂−O−CO−CH₂−O−⟨C₆H₄⟩(CH₃) | Cl |
| 12 | −CH₂CH₂−O−CO−CH₂−⟨C₆H₄⟩−OC₂H₅ | Cl |
| 13 | −CH₂CH₂−O−CO−CH₂−⟨C₆H₄⟩−C₃H₇ | Cl |

DYEING EXAMPLES (A) A mixture of 7 parts of the dye of Example 1, 4 parts of sodium dinaphthylmethane sulphonate, 4 parts of sodium cetylsulphate and 5 parts of anhydrous sodium sulphate is ground in a ball mill for 48 hours to give a fine powder. One part of the powder is suspended in a small amount of water and the suspension run through a sieve into a bath of 4000 parts of water containing 2 parts of sodium laurylsulphate. The liquor to goods ratio is 40:1. 100 parts of a scoured fabric of polyester fibre are entered in the bath at 40–50°, after which 20 parts of aqueous emulsion of a chlorinated benzene are added. The bath is raised slowly to 100° and the fabric dyed for 1–2 hours at 95–100°, after which time it is removed, rinsed, soaped, rinsed again and dried. A level red dyeing is obtained which is very fast to light, cross-dyeing, washing, water, sea water, perspiration, sublimation, gas fumes, thermofixation, pleating and permanent press finishing.

(B) A mixture of 30 parts of the dye of Example 2, 40 parts of sodium dinaphthylmethane disulphonate, 50 parts of sodium cetylsulphate and 50 parts of anhydrous sodium sulphate is ground in a ball mill to form a fine powder. A dyebath is prepared with 4 parts of this powder and 1000 parts of water at 40–50°. 100 parts of a scoured polyester fabric are entered into the bath and its temperature is then increased to 130°, on which dyeing is continued for about 1 hour under static pressure. On removal the fabric is rinsed, soaped, rinsed and dried. The dyeing is of red shade and has fastness properties comparable to those of the dyeing of Example A.

(C) A mixture of 20 parts of the dye of Example 1, 55 parts of powdered sulphite cellulose lye and 800 parts of water is ground in a ball mill until the size of the dye particles is less than 1 micron. The colloidal solution thus obtained is mixed with 25 parts of ethylene diglycol monobutylether and 400 parts of 6% carboxymethyl cellulose to give a printing paste which is highly suitable for the vigoureux printing of polyester tops. The tops are printed with two rollers giving a coverage of 78% and without intermediate drying are steamed at 120°. The red prints thus obtained have good fastness properties.

(D) a fine aqueous dispersion of 30 parts of the dye of Example 2, 70 parts of sodium dinaphthylmethane disulphonate and 3 parts of sodium alginate is prepared, and subsequently water is added with good stirring to give a total 1000 parts of dyeliquor. This dyeliquor is padded on a polyester fabric at 20° and the fabric air dried at 60–100°, after which the dyeing is fixed by treatment for 1 minute in dry heat at 230°. Subsequently the fabric is rinsed, soaped, rinsed again and dried. A fast, level red dyeing is obtained.

Formulae of representative dyes of the foregoing examples are as follows:

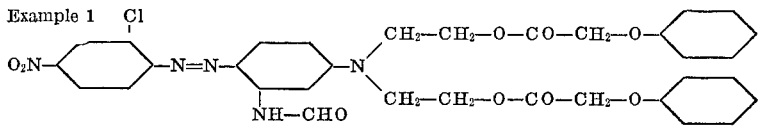

Example 1

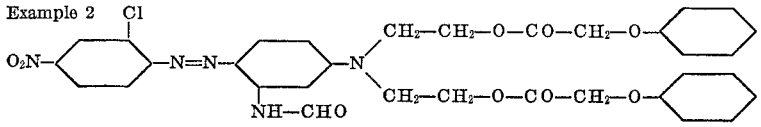

Example 2

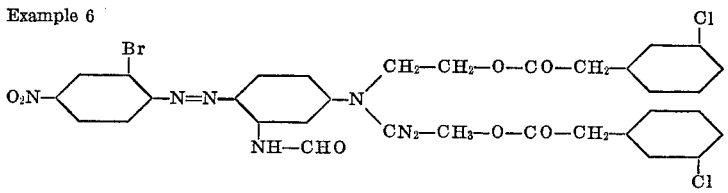

Example 6

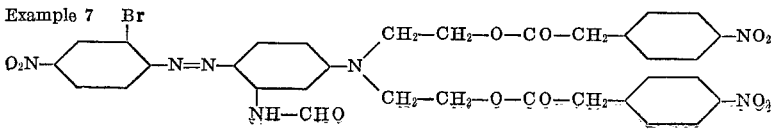

Example 7

Example 12

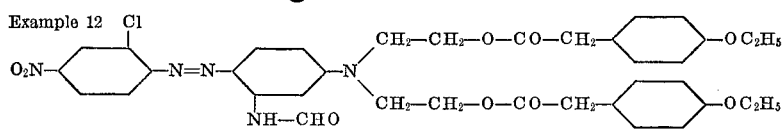

Having thus disclosed the invention what we claim is:
1. A compound of the formula

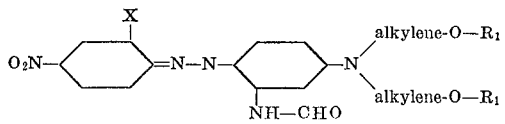

wherein

X is chloro or bromo;

$R_1$ is a substituted or unsubstituted member selected from the group consisting of benzylcarbonyl and phenoxyacetyl, any substituent on a substituted member being on a phenyl ring and being selected from the group consisting of fluoro, chloro, bromo, lower alkyl, lower alkoxy and nitro; and, each alkylene has from 1 to 4 carbon atoms.

2. The azo compound according to claim 1 of the formula

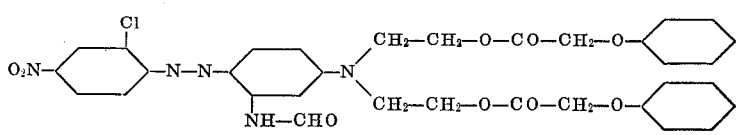

3. The azo compound according to claim 1 of the formula

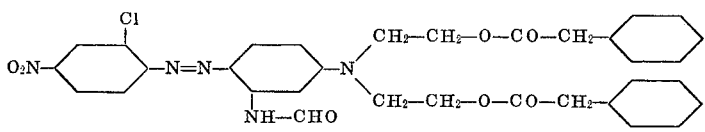

4. The azo compound according to claim 1 of the formula

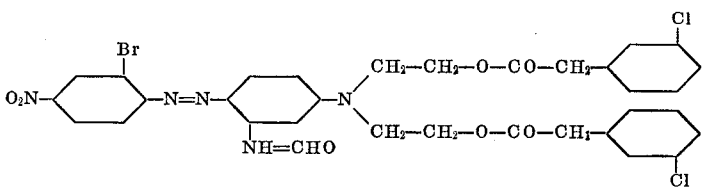

5. The azo compound according to claim 1 of the formula

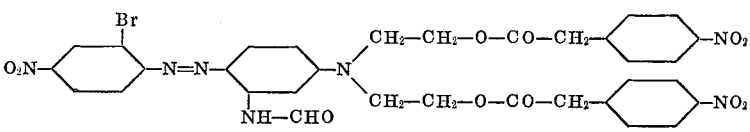

6. The azo compound according to claim 1 of the formula

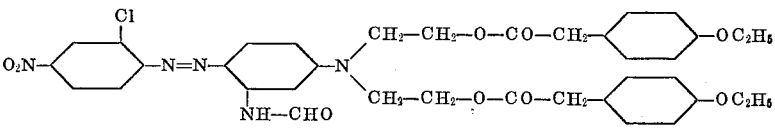

References Cited

FOREIGN PATENTS 1,058,378   2/1967   Great Britain _____ 260—207.1
1,066,085   4/1967   Great Britain _____ 260—207.1

LEWIS GOTTS, Primary Examiner

C. F. WARREN, Assistant Examiner

U.S. Cl. X.R.

260—207.1; 8—41 C